US012798251B2

(12) United States Patent
Taniuchi et al.

(10) Patent No.: US 12,798,251 B2
(45) Date of Patent: Nov. 17, 2026

(54) LIQUID EJECTING APPARATUS HAVING A DRIVE CONTROL UNIT FOR MICRO-VIBRATION CONTROL

(71) Applicant: SEIKO EPSON CORPORATION, Tokyo (JP)

(72) Inventors: Akinori Taniuchi, Matsumoto (JP); Nobuaki Ito, Suwa (JP)

(73) Assignee: SEIKO EPSON CORPORATION (JP)

(*) Notice: Subject to any disclaimer, the term of this patent is extended or adjusted under 35 U.S.C. 154(b) by 183 days.

(21) Appl. No.: 18/961,543

(22) Filed: Nov. 27, 2024

(65) Prior Publication Data

US 2025/0178351 A1 Jun. 5, 2025

(30) Foreign Application Priority Data

Nov. 30, 2023 (JP) ................................ 2023-202524

(51) Int. Cl.
*B41J 2/17* (2006.01)
*B41J 2/045* (2006.01)
*B41J 2/14* (2006.01)

(52) U.S. Cl.
CPC ......... *B41J 2/1707* (2013.01); *B41J 2/04581* (2013.01); *B41J 2/04588* (2013.01); *B41J 2/14233* (2013.01)

(58) Field of Classification Search
None
See application file for complete search history.

(56) References Cited

U.S. PATENT DOCUMENTS

2013/0208034 A1 8/2013 Zhang

FOREIGN PATENT DOCUMENTS

JP 2013-163290 A 8/2013

*Primary Examiner* — Leslie J Thompson
(74) *Attorney, Agent, or Firm* — Harness, Dickey & Pierce, P.L.C.

(57) ABSTRACT

The drive control unit performs the micro-vibration control such that $(C^2B^4)/(DA^4)\times0.052\leq M\leq(C^2B^4)/(DA^4)\times0.365$, in which A represents the diameter of the first nozzle portion, B represents the diameter of the second nozzle portion, C represents a height of the first nozzle portion, D represents a height of the second nozzle portion, and M represents a maximum retraction amount of a meniscus of the liquid during the micro-vibration control by the drive control unit.

8 Claims, 8 Drawing Sheets

FIG. 6

| | $C^2B^4/DA^4$ | M[μm] | NO MENISCUS BREAKAGE | ELIMINATION OF THICKENING |
|---|---|---|---|---|
| COMPARATIVE EXAMPLE 1 | 48.025 | 1,1711 | GOOD | POOR |
| COMPARATIVE EXAMPLE 2 | 48.025 | 1.552 | GOOD | POOR |
| COMPARATIVE EXAMPLE 3 | 48.025 | 1.96 | GOOD | POOR |
| EXAMPLE 1 | 48.025 | 2.4973 | GOOD | FAIR |
| EXAMPLE 2 | 48.025 | 5.744 | GOOD | FAIR |
| EXAMPLE 3 | 48.025 | 8.369 | GOOD | GOOD |
| EXAMPLE 4 | 48.025 | 10.63 | GOOD | GOOD |
| EXAMPLE 5 | 48.025 | 17.5291 | FAIR | GOOD |
| COMPARATIVE EXAMPLE 4 | 48.025 | 20.69 | POOR | GOOD |
| COMPARATIVE EXAMPLE 5 | 48.025 | 26.88 | POOR | GOOD |
| COMPARATIVE EXAMPLE 6 | 48.025 | 36.24 | POOR | GOOD |
| COMPARATIVE EXAMPLE 7 | 33.369 | 0.7114 | GOOD | POOR |
| COMPARATIVE EXAMPLE 8 | 33.369 | 1.237 | GOOD | POOR |
| EXAMPLE 6 | 33.369 | 2.01369 | GOOD | FAIR |
| EXAMPLE 7 | 33.369 | 4.456 | GOOD | FAIR |
| EXAMPLE 8 | 33.369 | 7.301 | GOOD | GOOD |
| EXAMPLE 9 | 33.369 | 11.417 | FAIR | GOOD |
| COMPARATIVE EXAMPLE 9 | 33.369 | 19.348 | POOR | GOOD |
| COMPARATIVE EXAMPLE 10 | 33.369 | 25.6668 | POOR | GOOD |
| COMPARATIVE EXAMPLE 11 | 19.48 | 0.57789 | GOOD | POOR |
| EXAMPLE 10 | 19.48 | 1.16521 | GOOD | FAIR |
| EXAMPLE 11 | 19.48 | 4.2222 | GOOD | GOOD |
| EXAMPLE 12 | 19.48 | 6.369 | FAIR | GOOD |
| COMPARATIVE EXAMPLE 12 | 19.48 | 10.985 | POOR | GOOD |
| COMPARATIVE EXAMPLE 13 | 19.48 | 23.6977 | POOR | GOOD |

FIG. 7

| | $C^2B^4/DA^4$ | M[μm] | NO MENISCUS BREAKAGE | ELIMINATION OF THICKENING |
|---|---|---|---|---|
| COMPARATIVE EXAMPLE 14 | 55.11 | 0.638 | GOOD | POOR |
| COMPARATIVE EXAMPLE 15 | 55.11 | 1.4778 | GOOD | POOR |
| COMPARATIVE EXAMPLE 16 | 55.11 | 1.968 | GOOD | POOR |
| EXAMPLE 13 | 55.11 | 3.0367 | GOOD | FAIR |
| EXAMPLE 14 | 55.11 | 8.117 | GOOD | FAIR |
| EXAMPLE 15 | 55.11 | 11.781 | GOOD | GOOD |
| EXAMPLE 16 | 55.11 | 16.333 | FAIR | GOOD |
| EXAMPLE 17 | 55.11 | 19.4478 | FAIR | GOOD |
| COMPARATIVE EXAMPLE 17 | 55.11 | 24.313 | POOR | GOOD |
| COMPARATIVE EXAMPLE 18 | 55.11 | 26.771 | POOR | GOOD |
| COMPARATIVE EXAMPLE 19 | 55.11 | 37.644 | POOR | GOOD |
| COMPARATIVE EXAMPLE 20 | 63.91 | 1.039 | GOOD | POOR |
| COMPARATIVE EXAMPLE 21 | 63.91 | 1.824 | GOOD | POOR |
| COMPARATIVE EXAMPLE 22 | 63.91 | 3.107 | GOOD | POOR |
| EXAMPLE 18 | 63.91 | 3.61025 | GOOD | FAIR |
| EXAMPLE 19 | 63.91 | 6.48 | GOOD | FAIR |
| EXAMPLE 20 | 63.91 | 14.72 | GOOD | GOOD |
| EXAMPLE 21 | 63.91 | 19.934 | FAIR | GOOD |
| EXAMPLE 22 | 63.91 | 22.782 | FAIR | GOOD |
| COMPARATIVE EXAMPLE 23 | 63.91 | 25.71 | POOR | GOOD |
| COMPARATIVE EXAMPLE 24 | 63.91 | 30.89 | POOR | GOOD |
| COMPARATIVE EXAMPLE 25 | 63.91 | 42.78 | POOR | GOOD |

LIQUID EJECTING APPARATUS HAVING A DRIVE CONTROL UNIT FOR MICRO-VIBRATION CONTROL

The present application is based on, and claims priority from JP Application Serial Number 2023-202524, filed Nov. 30, 2023, the disclosure of which is hereby incorporated by reference herein in its entirety.

BACKGROUND

1. Technical Field

The present disclosure relates to a liquid ejecting apparatus.

2. Related Art

A liquid ejecting apparatus that ejects a liquid such as ink onto a medium such as printing paper has been proposed. For example, a liquid ejecting apparatus described in JP-A-2013-163290 includes a pressure chamber filled with a liquid, a piezoelectric element that causes a pressure change in the liquid in the pressure chamber, and a nozzle that ejects the liquid in the pressure chamber in response to the pressure change.

A liquid in a nozzle opening is in contact with the atmosphere, and thus, moisture evaporates. Then, the liquid in the nozzle opening thickens because a solvent component decreases. As a result, there is a possibility of nozzle clogging or ejection failure, which may adversely affect ejection characteristics of droplets. In order to solve such a problem, it is sufficient to perform an operation of ejecting a large amount of liquid, so-called flushing, before performing a recording operation on a medium by ejecting the liquid. However, the flushing has a disadvantage of consuming the liquid.

It is known to perform a circulation operation and a micro-vibration operation to solve the above problem. The circulation operation is an operation of supplying a liquid to an individual flow path communicating with a nozzle while discharging a liquid. The circulation operation allows a new liquid to be supplied to the individual flow path while discharging the liquid that may thicken due to evaporation in the nozzle opening from the individual flow path. As a result, it is possible to suppress thickening of the liquid in the nozzle. The micro-vibration operation is an operation in which a micro-vibration waveform is applied to a piezoelectric element, causing meniscus vibration of the liquid in the nozzle opening to the extent that the liquid is not ejected, and stirring the liquid in the nozzle. The micro-vibration operation can eliminate local thickening in the nozzle.

In general, the thickening of the ink can be sufficiently suppressed by performing any one of the circulation operation and the micro-vibration operation. However, in some cases, both the circulation operation and the micro-vibration operation need to be performed at the same time such as in the liquid ejecting apparatus of JP-A-2013-163290. When the nozzle has a straight tube structure without steps, there is no particular problem in using the circulation operation and the micro-vibration operation in combination. However, it has been found that, when a so-called two-stage nozzle divided into an upper nozzle and a lower nozzle is used, performing the circulation operation and the micro-vibration operation in combination can cause problems such as a meniscus breakage and a failure to eliminate the thickening of the liquid in the nozzle.

As a result of the study conducted by the inventors, it has been found that there is a correlation between diameters and heights of the upper and lower nozzles and a retraction height of a meniscus in the lower nozzle, and that by setting a value of the correlation within a predetermined range, the problems that arise in the case of using the two-stage nozzle can be solved.

SUMMARY

According to an aspect of the present disclosure, a liquid ejecting apparatus includes: a liquid ejecting head that includes a plurality of individual flow paths that each include a pressure chamber and a nozzle, a common supply flow path that communicates with the plurality of individual flow paths and supplies a liquid to the plurality of individual flow paths, a common discharge flow path that communicates with the plurality of individual flow paths and discharges the liquid from the plurality of individual flow paths, and a piezoelectric element provided corresponding to the pressure chamber; and a drive control unit that performs ejection control for driving the piezoelectric element to eject the liquid and micro-vibration control for driving the piezoelectric element to micro-vibrate the liquid in the nozzle, in which in the nozzle, a first nozzle portion and a second nozzle portion provided closer to the individual flow path than the first nozzle portion is and having a diameter larger than a diameter of the first nozzle portion are connected in a height direction, and the drive control unit performs the micro-vibration control such that $(C^2B^4)/(DA^4)\times 0.052 \le M \le (C^2B^4)/(DA^4)\times 0.365$, in which A represents the diameter of the first nozzle portion, B represents the diameter of the second nozzle portion, C represents a height of the first nozzle portion, D represents a height of the second nozzle portion, and M represents a maximum retraction amount of a meniscus of the liquid during the micro-vibration control by the drive control unit.

BRIEF DESCRIPTION OF THE DRAWINGS

FIG. 6 is a table showing experimental results.

FIG. 7 is a table showing experimental results.

DESCRIPTION OF EMBODIMENTS

Figure 1:
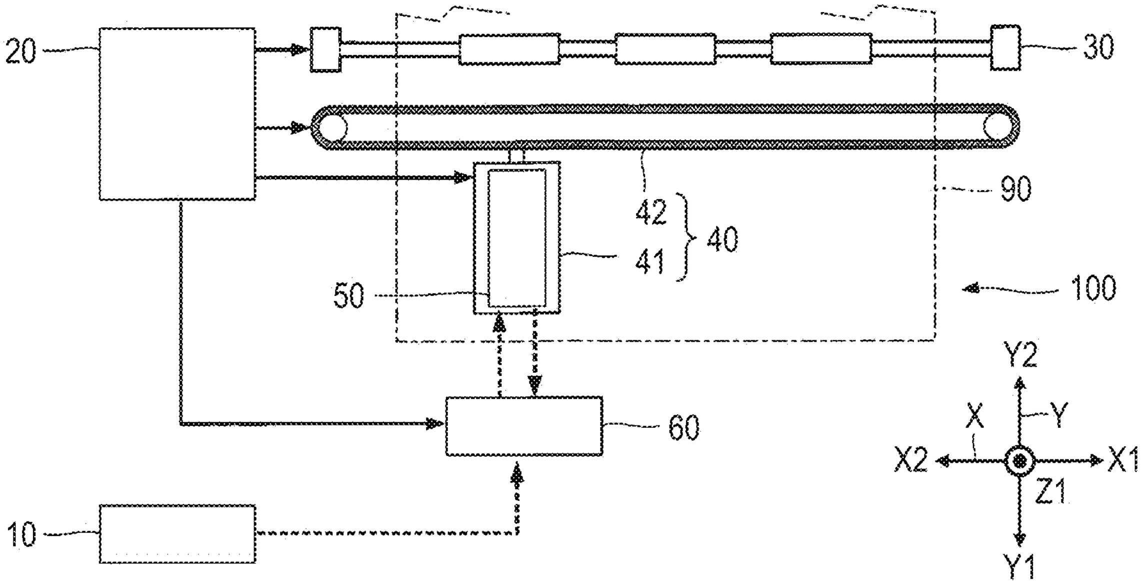
FIG. 1 is a schematic diagram illustrating an example of a configuration of a liquid ejecting apparatus according to an embodiment.

Hereinafter, exemplary embodiments according to the present disclosure will be described with reference to the accompanying drawings. Note that the dimensions and the scale of each component may differ appropriately from actual dimensions and scale, and some portions are schematically illustrated in the drawings to facilitate understanding. Further, the scope of the present disclosure is not limited to the embodiments unless otherwise specified in the following description.

In the following description, an X axis, a Y axis, and a Z axis that intersect one another are appropriately used. Hereinafter, a direction along the X axis is referred to as an X1 direction, and a direction opposite to the X1 direction is referred to as an X2 direction. Similarly, directions opposite to each other along the Y axis are a Y1 direction and a Y2 direction. Directions opposite to each other along the Z axis are a Z1 direction and a Z2 direction. Typically, the Z axis is a vertical axis, and the Z2 direction corresponds to a downward direction along the vertical axis. However, the Z axis does not have to be a vertical axis. The X axis, the Y axis, and the Z axis are typically orthogonal to one another. However, the X axis, the Y axis, and the Z axis are not limited thereto, and it is sufficient if the X axis, the Y axis, and the Z axis intersect one another within an angle range of 80° to 100°.

A: Embodiment

A1: Overall Configuration of Liquid Ejecting Apparatus

FIG. 1 is a schematic diagram illustrating an example of a configuration of a liquid ejecting apparatus 100 according to an embodiment. The liquid ejecting apparatus 100 is an ink jet printing apparatus that ejects a liquid such as ink in the form of droplets onto a medium 90. The medium 90 is, for example, printing paper. The medium 90 is not limited to printing paper, and may be a printing target made of any material such as a resin film or cloth, for example.

As illustrated in FIG. 1, the liquid ejecting apparatus 100 includes a liquid container 10, a drive control unit 20, a transport mechanism 30, a movement mechanism 40, a liquid ejecting head 50, and a circulation mechanism 60.

The liquid container 10 stores the ink. Specific aspects of the liquid container 10 include, for example, a cartridge that is attachable to and detachable from the liquid ejecting apparatus 100, a bag-shaped ink pack made of a flexible film, and an ink tank that can be refilled with ink. Any type of the ink may be stored in the liquid container 10.

The drive control unit 20 controls an operation of each element of the liquid ejecting apparatus 100. The drive control unit 20 includes, for example, one or a plurality of processing circuits such as a central processing unit (CPU) and a field programmable gate array (FPGA), and one or a plurality of storage circuits such as a semiconductor memory.

The transport mechanism 30 transports the medium 90 in the Y1 direction under the control of the drive control unit 20. The movement mechanism 40 reciprocates the liquid ejecting head 50 along the X axis under the control of the drive control unit 20. The movement mechanism 40 includes a substantially box-shaped carriage 41 that accommodates the liquid ejecting head 50, and an endless transport belt 42 to which the carriage 41 is fixed. The number of liquid ejecting heads 50 mounted on the carriage 41 is not limited to one, and may be plural. In addition to the liquid ejecting head 50, the above-described liquid container 10 may be mounted on the carriage 41.

The liquid ejecting head 50 ejects the ink supplied from the liquid container 10 onto the medium 90 from each of a plurality of nozzles under the control of the drive control unit 20, based on printing data Img. The ejection is performed in parallel with the transport of the medium 90 by the transport mechanism 30 and the reciprocating movement of the liquid ejecting head 50 by the movement mechanism 40, thereby forming an image corresponding to the printing data Img on a surface of the medium 90 with the ink.

The liquid container 10 is coupled to the liquid ejecting head 50 via the circulation mechanism 60. The circulation mechanism 60 is a mechanism that, under the control of the drive control unit 20, supplies the ink to the liquid ejecting head 50 and recovers the ink discharged from the liquid ejecting head 50 to re-supply the ink to the liquid ejecting head 50. The operation of the circulation mechanism 60 can suppress an increase in viscosity of the ink and reduce retention of air bubbles in the ink.

A2: Electrical Configuration of Liquid Ejecting Apparatus 100

Figure 2:
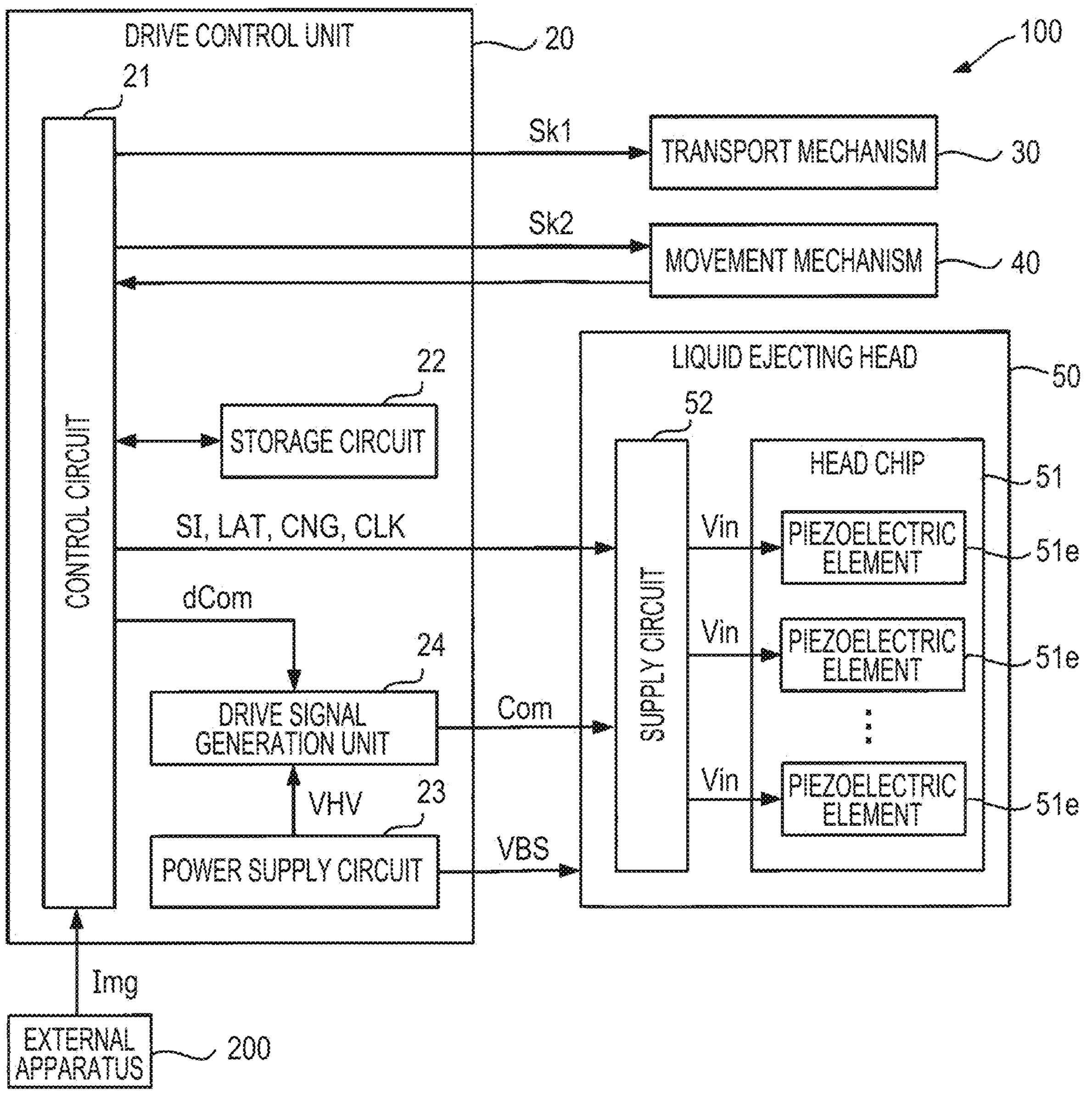
FIG. 2 is a diagram illustrating an electrical configuration of the liquid ejecting apparatus according to the embodiment.

FIG. 2 is a diagram illustrating an electrical configuration of the liquid ejecting apparatus 100 according to the embodiment. As illustrated in FIG. 2, the liquid ejecting head 50 includes a head chip 51 and a supply circuit 52. The head chip 51 includes a plurality of piezoelectric elements 51*e*. As described below, for example, two piezoelectric elements 51*e* are provided for one nozzle. One piezoelectric element 51*e* may be provided for one nozzle N.

The supply circuit 52 switches whether or not to supply a drive signal Com output from the drive control unit 20 as a supply signal Vin to each of the plurality of piezoelectric elements 51*e* under the control of the drive control unit 20.

As illustrated in FIG. 2, the drive control unit 20 includes a control circuit 21, a storage circuit 22, a power supply circuit 23, and a drive signal generation unit 24.

The control circuit 21 has a function of controlling an operation of each part of the liquid ejecting apparatus 100, and a function of processing various types of data. For example, the control circuit 21 includes one or more processors such as a central processing unit (CPU). The control circuit 21 may include, instead of or in addition to the CPU, a programmable logic device such as a field-programmable gate array (FPGA). Further, when the control circuit 21 includes a plurality of processors, the plurality of processors may be mounted on different substrates or the like. The control circuit 21 may be regarded as a "drive control unit".

The storage circuit 22 stores various programs to be executed by the control circuit 21 and various types of data to be processed by the control circuit 21, such as the printing data Img. The storage circuit 22 includes, for example, one of or both of a volatile semiconductor memory such as a random access memory (RAN), and a non-volatile semiconductor memory such as a read only memory (ROM), an electrically erasable programmable read only memory (EEPROM) or a programmable ROM (PROM). The printing data Img is supplied from an external apparatus 200 such as a personal computer or a digital camera. The storage circuit 22 may be configured as a part of the control circuit 21.

The power supply circuit 23 receives power supplied from a commercial power supply (not illustrated) and generates various predetermined potentials. Various generated potentials are appropriately supplied to each part of the liquid ejecting apparatus 100. For example, the power supply circuit 23 generates a power supply potential VHV and an offset potential VBS. The offset potential VBS is supplied to the liquid ejecting head 50. Further, the power supply potential VHV is supplied to the drive signal generation unit 24.

The drive signal generation unit 24 is a circuit that repeatedly generates the drive signal Com for driving each piezoelectric element 51*e*. Specifically, the drive signal generation unit 24 includes, for example, a DA conversion circuit and an amplifier circuit. In the drive signal generation unit 24, the DA conversion circuit converts a waveform designation signal dCom from the control circuit 21 from a digital signal to an analog signal. The amplifier circuit amplifies the analog signal by using the power supply potential VHV from the power supply circuit 23 to generate the drive signal Com. A signal having a waveform actually supplied to each piezoelectric element 51*e* among the waveforms included in the drive signal Com is the supply signal Vin described above. The waveform designation signal dCom is a digital signal for designating a waveform of the drive signal Com.

The control circuit 21 controls the operation of each part of the liquid ejecting apparatus 100 by executing a program stored in the storage circuit 22. Here, the control circuit 21 generates control signals Sk1 and Sk2, a printing data signal SI, the waveform designation signal dCom, a latch signal LAT, a change signal CNG, and a clock signal CLK as signals for controlling the operation of each part of the liquid ejecting apparatus 100 by executing the program.

The control signal Sk1 is a signal for controlling the driving of the transport mechanism 30. The control signal Sk2 is a signal for controlling the driving of the movement mechanism 40. The printing data signal SI is a digital signal for designating an operation state of each piezoelectric element 51*e*. The latch signal LAT and the change signal CNG are timing signals that are used together with the printing data signal SI to specify a timing of ink ejection from each nozzle. The timing signals are generated based on, for example, an output of an encoder that detects a position of the carriage 41 described above.

A3: Flow Path of Liquid Ejecting Head 50

Figure 3:
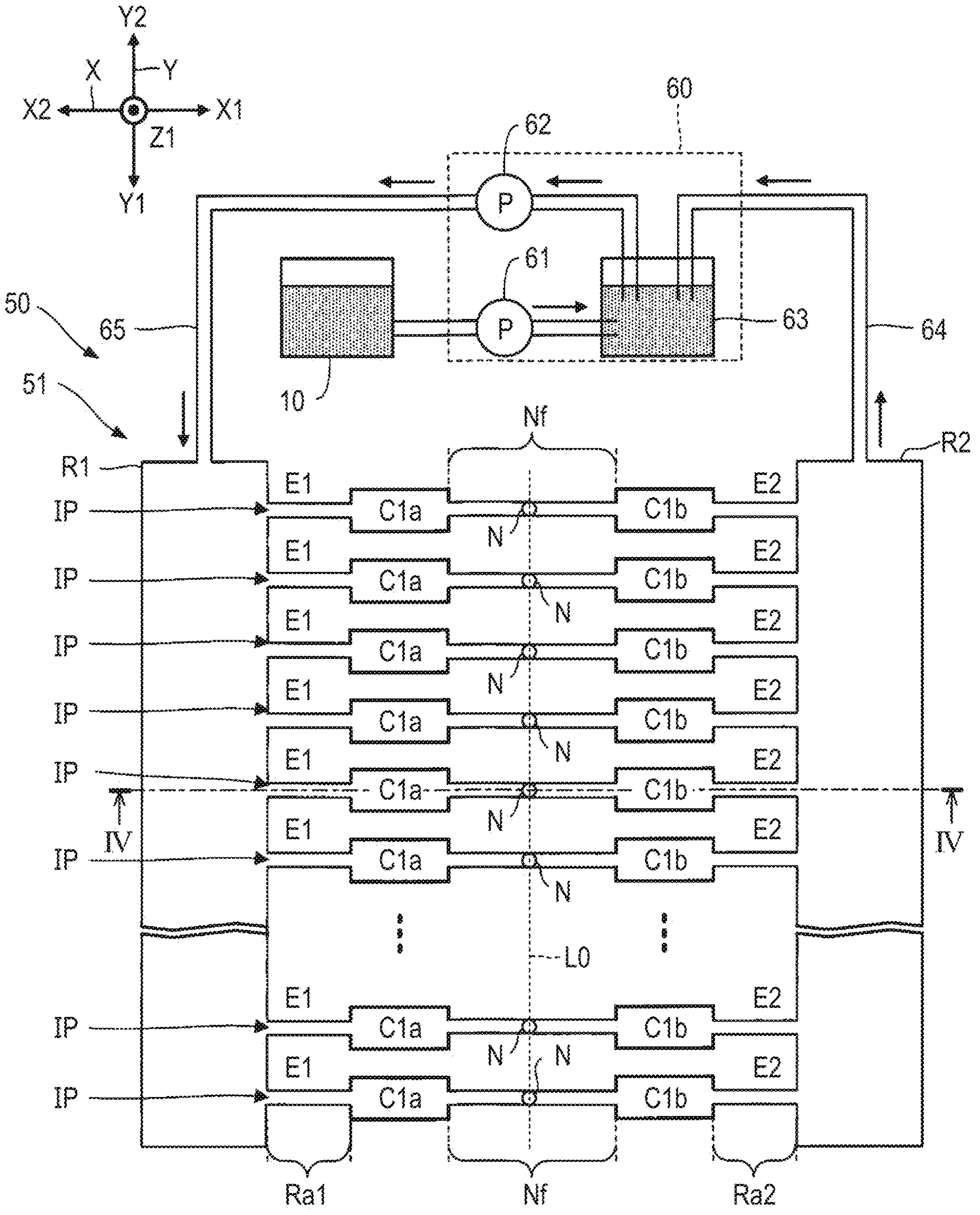
FIG. 3 is a schematic diagram for describing a circulating flow path of a liquid ejecting head.

FIG. 3 is a schematic diagram for describing a circulating flow path of the liquid ejecting head 50. As illustrated in FIG. 3, a plurality of individual flow paths IP, a common supply flow path R1, and a common discharge flow path R2 are provided in the liquid ejecting head 50. The circulation mechanism 60 is coupled to the common supply flow path R1 and the common discharge flow path R2. The circulation path is formed by the plurality of individual flow paths IP, the common supply flow path R1, and the common discharge flow path R2.

Each individual flow path IP includes the nozzle N, a pressure chamber C1*a*, a pressure chamber C1*b*, a communication flow path Nf, an individual supply flow path Ra1, and an individual discharge flow path Ra2.

The plurality of nozzles N are arranged along the Y axis. Each of the plurality of nozzles N ejects the ink in the Z2 direction. A set of the plurality of nozzles N forms a nozzle row L0. Further, the plurality of nozzles N are arranged at equal intervals.

The individual flow path IP communicates with each nozzle N. The plurality of individual flow paths IP extend along the X axis and communicate with the respective different nozzles N. The plurality of individual flow paths IP are arranged along the Y axis. Each individual flow path IP supplies the ink to the pressure chamber C1*a* and discharges the ink from the pressure chamber C1*b*.

Each of the pressure chambers C1*a* and C1*b* extends along the X axis and is a space in which the ink to be discharged from the nozzle N communicating with the individual flow path IP is stored. In the example illustrated in FIG. 3, the plurality of pressure chambers C1*a* are arranged along the Y axis. Similarly, the plurality of pressure chambers C1*b* are arranged along the Y axis. In each individual flow path IP, positions of the pressure chambers C1*a* and C1*b* in a direction along the Y axis are the same as each other in the example illustrated in FIG. 3, but may be different from each other. In the following description, the pressure chambers C1*a* and C1*b* are simply referred to as a "pressure chamber C1" when not distinguished.

The communication flow path Nf is disposed between the pressure chambers C1*a* and C1*b* in each individual flow path IP. In each individual flow path IP, the communication flow path Nf is a flow path for communication between the pressure chamber C1*a* and the pressure chamber C1*b*. A plurality of communication flow paths Nf are arranged along the Y axis at intervals. The nozzle N is provided in each communication flow path Nf. In each communication flow path Nf, the ink is ejected from the nozzle N due to pressure changes in the pressure chamber C1*a* and the pressure chamber C1*b* described above.

In each individual flow path IP, the individual supply flow path Ra1 is provided between the pressure chamber C1*a* and the common supply flow path R1. The individual supply flow path Ra1 is a flow path for communication between the pressure chamber C1*a* and the common supply flow path R1. Similarly, in each individual flow path IP, the individual discharge flow path Ra2 is provided between the pressure chamber C1*b* and the common discharge flow path R2. The individual discharge flow path Ra2 is a flow path for communication between the pressure chamber C1*b* and the common discharge flow path R2.

The plurality of individual flow paths IP commonly communicate with the common supply flow path R1 and the common discharge flow path R2. Each of the common supply flow path R1 and the common discharge flow path R2 is a space that extends along the Y axis over the entire range in which the plurality of nozzles N are distributed. The plurality of individual flow paths IP are positioned between the common supply flow path R1 and the common discharge flow path R2 when viewed in a direction along the Z axis.

The common supply flow path R1 is coupled to an end portion E1 of each individual flow path IP in the X2 direction. The common supply flow path R1 communicates with the plurality of individual flow paths IP and supplies the ink to the plurality of individual flow paths IP. The ink to be supplied to each individual flow path IP is stored in the common supply flow path R1. On the other hand, the common discharge flow path R2 is coupled to an end portion E2 of each individual flow path IP in the X1 direction. The common discharge flow path R2 communicates with the plurality of individual flow paths IP and discharges the ink from the plurality of individual flow paths IP. The ink to be discharged from each individual flow path IP is stored in the common discharge flow path R2.

The circulation mechanism 60 is coupled to the common supply flow path R1 and the common discharge flow path R2. The circulation mechanism 60 supplies the ink to the common supply flow path R1 and recovers the ink discharged from the common discharge flow path R2 to re-supply the ink to the common supply flow path R1. The circulation mechanism 60 includes a first supply pump 61, a second supply pump 62, a storage container 63, a recovery flow path 64, and a supply flow path 65.

The first supply pump 61 is a pump that supplies the ink stored in the liquid container 10 to the storage container 63. The storage container 63 is a sub-tank that temporarily stores the ink supplied from the liquid container 10. The recovery flow path 64 is a flow path for communication between the common discharge flow path R2 and the storage container 63 and for recovering the ink from the common discharge flow path R2 to the storage container 63. The ink stored in the liquid container 10 is supplied through the first supply pump 61 to the storage container 63, and the ink discharged from each individual flow path IP to the common discharge flow path R2 is supplied to the storage container 63 via the recovery flow path 64. The second supply pump 62 is a pump that supplies the ink stored in the storage container 63. The supply flow path 65 is a flow path for communication between the common supply flow path R1 and the storage container 63 and for supplying the ink from the storage container 63 to the common supply flow path R1.

A4: Specific Structure of Head Chip 51

Figure 4:
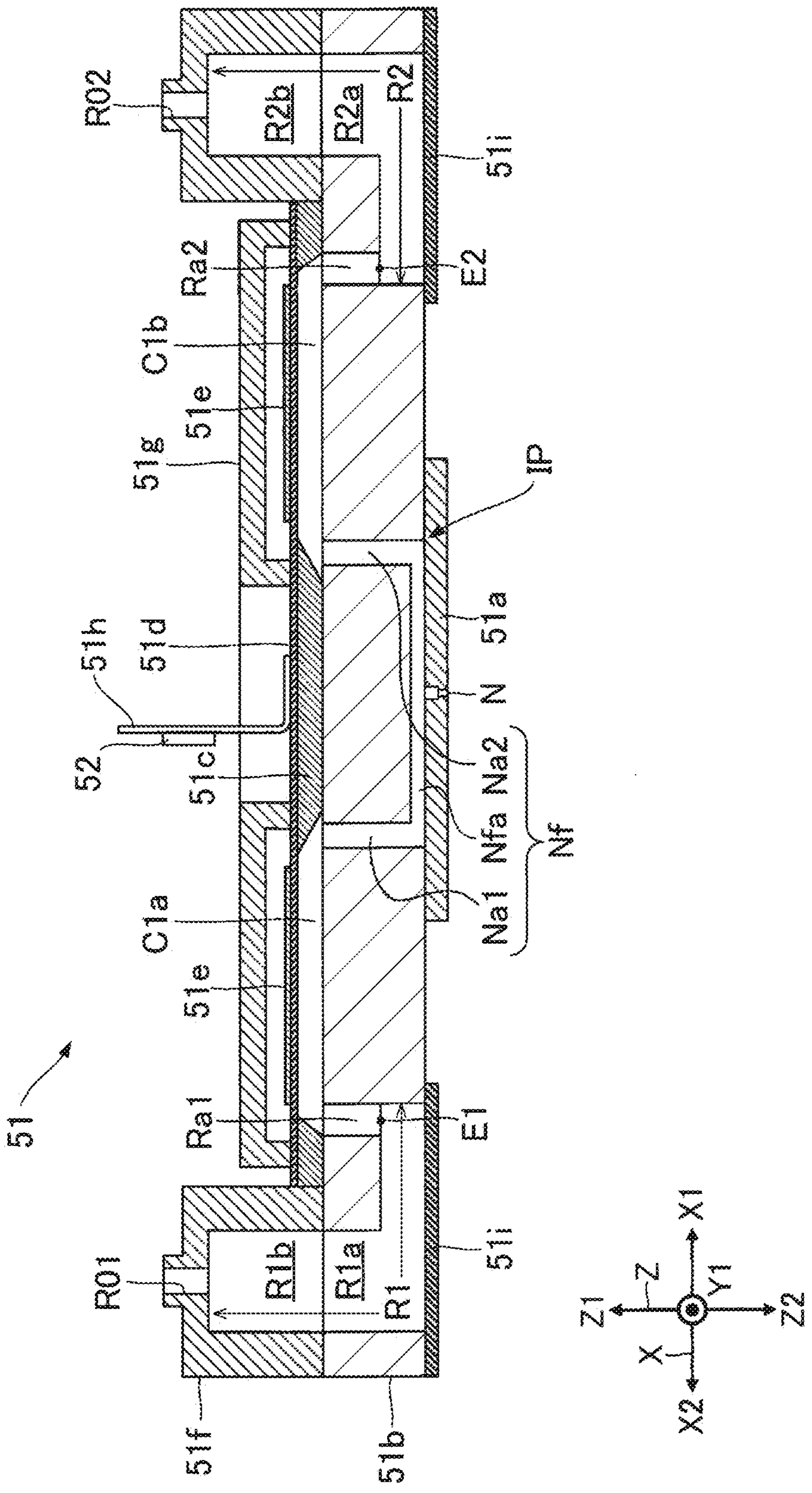
FIG. 4 is a sectional view taken along line IV-IV in FIG. 3.

FIG. 4 is a sectional view taken along line IV-IV in FIG. 3. FIG. 4 illustrates a section of the head chip 51 taken along the individual flow path IP on a plane perpendicular to the Y axis. The head chip 51 includes a nozzle substrate 51*a*, a flow path substrate 51*b*, a pressure chamber substrate 51*c*, a diaphragm 51*d*, the plurality of piezoelectric elements 51*e*, a case 51*f*, a protective plate 51*g*, and a wiring substrate 51*h*.

The nozzle substrate 51*a*, the flow path substrate 51*b*, the pressure chamber substrate 51*c*, and the diaphragm 51*d* are stacked in this order in the Z1 direction. Each of the members extends along the Y axis, and is manufactured, for example, by processing a single crystal silicon substrate using a semiconductor processing technology. The members are bonded together with an adhesive or the like. Other layers such as an adhesive layer or other substrates may be appropriately interposed between two of the members adjacent to each other.

The plurality of nozzles N are provided in the nozzle substrate 51*a*. Each of the nozzles N extends along the Z axis and penetrates the nozzle substrate 51*a*, and is a through hole through which the ink passes.

In the flow path substrate 51*b*, a portion of the plurality of individual flow paths IP excluding the pressure chambers C1*a* and C1*b*, a liquid chamber R1*a* that is a part of the common supply flow path R1, and a liquid chamber R2*a* that is a part of the common discharge flow path R2 are provided. That is, the communication flow path Nf, the individual supply flow path Ra1, the individual discharge flow path Ra2, the liquid chamber R1*a*, and the liquid chamber R2*a* are provided in the flow path substrate 51*b*.

Each of the liquid chambers R1*a* and R2*a* is a space that penetrates the flow path substrate 51*b*. A vibration absorber 51*i* that closes an opening of the space is provided on a surface of the flow path substrate 51*b* that faces the Z2 direction.

The vibration absorber 51*i* is a layered member made of an elastic material. The vibration absorber 51*i* forms a part of a wall surface of each of the common supply flow path R1 and the common discharge flow path R2, and absorbs pressure changes in the common supply flow path R1 and the common discharge flow path R2.

The communication flow path Nf includes a first communication flow path Na1, a second communication flow path Na2, and a nozzle flow path Nfa. Each of the first communication flow path Na1 and the second communication flow path Na2 is a space that penetrates the flow path substrate 51*b*. The first communication flow path Na1 and the second communication flow path Na2 communicate with each other via the nozzle flow path Nfa. The pressure chamber C1*a* and the nozzle flow path Nfa communicate with each other through the first communication flow path Na1. The pressure chamber C1*b* and the nozzle flow path Nfa communicate with each other through the second communication flow path Na2. The nozzle flow path Nfa is a space in a groove provided on the surface of the flow path substrate 51*b* that faces the Z2 direction, and extends along the X axis. The nozzle substrate 51*a* forms a part of a wall surface of the nozzle flow path Nfa.

Each of the individual supply flow path Ra1 and the individual discharge flow path Ra2 is a space penetrating the flow path substrate 51*b*. The common supply flow path R1 and the pressure chamber C1*a* communicate with each other through the individual supply flow path Ra1, and the individual supply flow path Ra1 supplies the ink from the common supply flow path R1 to the pressure chamber C1*a*. One end of the individual supply flow path Ra1 is opened on a surface of the flow path substrate 51*b* that faces the Z1 direction. The other end of the individual supply flow path Ra1 is an upstream end of the individual flow path IP, and is opened on a wall surface of the common supply flow path R1 in the flow path substrate 51*b*. On the other hand, the common discharge flow path R2 and the pressure chamber C1*b* communicate with each other through the individual discharge flow path Ra2, and the individual discharge flow path Ra2 discharges the ink from the pressure chamber C1*b* to the common discharge flow path R2. One end of the individual discharge flow path Ra2 is opened on the surface of the flow path substrate 51*b* that faces the Z1 direction. The other end of the individual discharge flow path Ra2 is a downstream end of the individual flow path IP, and is opened on a wall surface of the common discharge flow path R2 in the flow path substrate 51*b*.

The pressure chambers C1*a* and C1*b* of the plurality of individual flow paths IP are provided in the pressure chamber substrate 51*c*. Each of the pressure chambers C1*a* and C1*b* penetrates the pressure chamber substrate 51*c* and is a gap between the flow path substrate 51*b* and the diaphragm 51*d*. The pressure chamber C1*a* communicates with the nozzle N through the first communication flow path Na1 and the nozzle flow path Nfa. The pressure chamber C1*b* communicates with the nozzle N through the second communication flow path Na2 and the nozzle flow path Nfa.

The diaphragm 51*d* is a plate-like member that can elastically vibrate. The diaphragm 51*d* is a stacked body including, for example, a first layer made of silicon oxide ($SiO_2$) and a second layer made of zirconium oxide ($ZrO_2$). Another layer made of metal oxide or the like may be interposed between the first layer and the second layer. Furthermore, a part of or the entire diaphragm 51*d* may be formed integrally with the pressure chamber substrate 51*c* by using the same material. For example, the diaphragm 51*d* and the pressure chamber substrate 51*c* can be integrally formed by selectively removing a part of a region corresponding to the pressure chamber C1 in a thickness direction in a plate-like member having a predetermined thickness. Further, the diaphragm 51*d* may include layers of a single material.

The plurality of piezoelectric elements 51*e* provided corresponding to different pressure chambers C1 are installed on a surface of the diaphragm 51*d* that faces the Z1 direction. The plurality of piezoelectric elements 51*e* are provided in a one-to-one correspondence with the plurality of pressure chambers C1. The piezoelectric element 51*e* changes a pressure of the ink in the pressure chamber C1 according to the drive signal Com. Each piezoelectric element 51*e* is formed, for example, by stacking a first electrode and a second electrode facing each other and a piezoelectric layer disposed between the two electrodes. Each piezoelectric element 51*e* causes the ink in the pressure chamber C1 to be ejected from the nozzle N by changing the pressure of the ink in the pressure chamber C1. When the drive signal Com is supplied, the piezoelectric element 51*e* is deformed to vibrate the diaphragm 51*d*. Such vibration causes the pressure chamber C1 to expand and contract, thereby changing the pressure of the ink in the pressure chamber C1.

The case 51*f* is a case for storing the ink. A liquid chamber Rib that is a portion of the common supply flow path R1 other than the liquid chamber Ria, a liquid chamber R2*b* that is a portion of the common discharge flow path R2 other than the liquid chamber R2*a*, an inlet R01, and an outlet R02 are provided in the case 51*f*. Each of the liquid chamber Rib and the liquid chamber R2*b* is a recess provided on a surface of the case 51*f* that faces the Z2 direction. The inlet R01 is a through hole formed by an inner circumferential surface extending from a surface of the case 51*f* that faces the Z1 direction to a wall surface of the liquid chamber Rib. The inlet R01 is coupled to the supply flow path 65 of the circulation mechanism 60 described above. The outlet R02 is a through hole formed by an inner circumferential surface extending from the surface of the case 51*f* that faces the Z1 direction to a wall surface of the liquid chamber R2*b*. The outlet R02 is coupled to the recovery flow path 64 of the circulation mechanism 60 described above.

The protective plate 51*g* is a plate-like member installed on the surface of the diaphragm 51*d* that faces the Z1 direction, and protects the plurality of piezoelectric elements 51*e* and reinforces a mechanical strength of the diaphragm 51*d*. A space in which the plurality of piezoelectric elements 51*e* are accommodated is formed between the protective plate 51*g* and the diaphragm 51*d*.

The wiring substrate 51*h* is mounted on the surface of the diaphragm 51*d* that faces the Z1 direction, and is a mounted component for electrically coupling the drive control unit 20 and the head chip 51. For example, the flexible wiring substrate 51*h* such as a flexible printed circuit (FPC) or a flexible flat cable (FFC) is used as appropriate. The supply circuit 52 described above is mounted on the wiring substrate 51*h*.

In the head chip 51 configured as above, the ink flows through the common supply flow path R1, the individual supply flow path Ra1, the pressure chamber C1*a*, the communication flow path Nf, the pressure chamber C1*b*, the individual discharge flow path Ra2, and the common discharge flow path R2 in this order by the operation of the circulation mechanism 60 described above. In addition, the supply signal Vin from the supply circuit 52 simultaneously drives the piezoelectric elements 51*e* corresponding to both the pressure chamber C1*a* and the pressure chamber C1*b*, thereby changing the pressures in the pressure chamber C1*a* and the pressure chamber C1*b* to eject the ink from the nozzle N in response to the pressure changes.

A5: Nozzle N

Figure 5:
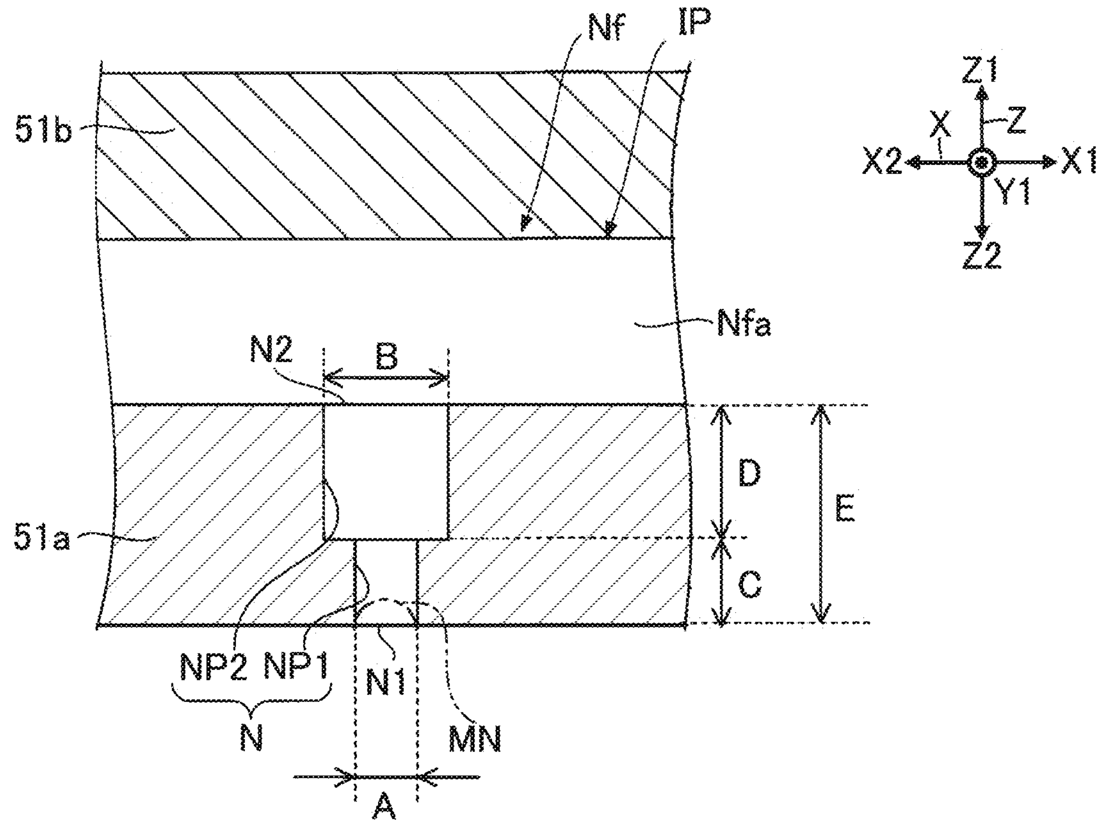
FIG. 5 is an enlarged sectional view of a nozzle.

FIG. 5 is an enlarged sectional view of the nozzle N. FIG. 5 is a sectional view of a part of the nozzle flow path Nfa included in the individual flow path IP and the nozzle N in a direction orthogonal to the Y axis. As illustrated in FIG. 5, the nozzle N branches off from the nozzle flow path Nfa included in the individual flow path IP and extends in a direction different from the nozzle flow path Nfa. Specifically, the nozzle flow path Nfa extends in a direction along the X axis, while the nozzle N extends in a direction along the Z axis.

The nozzle N is a through hole formed in the nozzle substrate 51*a*, and includes an ejection side opening end N1 and a coupling portion N2. The ejection side opening end N1 is an opening end of the nozzle N on a surface of the nozzle substrate 51*a* that faces the Z2 direction. The coupling portion N2 is a boundary portion between the nozzle flow path Nfa and the nozzle N. A length along the Z axis from the ejection side opening end N1 to the coupling portion N2 is a total length E of the nozzle N.

The nozzle N includes a first nozzle portion NP1 and a second nozzle portion NP2. The nozzle N is a so-called two-stage nozzle. The first nozzle portion NP1 and the second nozzle portion NP2 are arranged in this order in the Z1 direction and are connected in a direction along the Z axis, which is a height direction. Each of the first nozzle portion NP1 and the second nozzle portion NP2 extends along the Z axis. The second nozzle portion NP2 is provided closer to the nozzle flow path Nfa of the individual flow path IP than the first nozzle portion NP1 is. The nozzle flow path Nfa and the first nozzle portion NP1 communicate with each other through the second nozzle portion NP2. The first nozzle portion NP1 includes the ejection side opening end N1. The second nozzle portion NP2 includes the coupling portion N2.

A section of each of the first nozzle portion NP1 and the second nozzle portion NP2 has a circular shape. A central axis of the first nozzle portion NP1 and a central axis of the second nozzle portion NP2 are aligned with each other. Therefore, the first nozzle portion NP1 and the second nozzle portion NP2 are coaxially provided. The central axis of the first nozzle portion NP1 refers to an axis that passes through the center of the first nozzle portion NP1 and extends in the Z-axis direction. The central axis of the second nozzle portion NP2 refers to an axis that passes through the center of the second nozzle portion NP2 and extends in the Z-axis direction. The center here refers to, for example, a point whose position in the X-axis direction equally halves the maximum width of each portion in the X-axis direction, and whose position in the Y-axis direction equally halves the maximum width of each portion in the Y-axis direction.

In the illustrated example, a height C of the first nozzle portion NP1 is smaller than a height D of the second nozzle portion NP2. However, the height C may be equal to or larger than the height D. The height C is a length along the Z axis from the ejection side opening end N1 to a boundary between the first nozzle portion NP1 and the second nozzle portion NP2. The height D is a length along the Z axis from the boundary between the first nozzle portion NP1 and the second nozzle portion NP2 to the coupling portion N2.

A diameter B of the second nozzle portion NP2 is larger than a diameter A of the first nozzle portion NP1. Therefore, the nozzle N has a shape whose width increases stepwise in the Z1 direction. Since the diameter A is smaller than the diameter B, finer ink droplets can be ejected and higher landing accuracy of the ink droplets can be achieved compared to when the diameter of the nozzle N is uniform. The diameter B may be smaller than a width of the nozzle flow path Nfa, that is, a length along the Z axis. Since the diameter B is smaller than the width of the nozzle flow path Nfa, it is possible to reduce crosstalk between two second nozzle portions NP2 adjacent to each other in a direction along the Y axis.

The ink is in contact with the outside air at the ejection side opening end N1 of the nozzle N described above. Therefore, a solvent component contained in the ink at the ejection side opening end N1 evaporates, increasing the viscosity of the ink. As a result, there is a possibility of nozzle clogging or ejection failure. It is known to perform so-called flushing, in which a large amount of ink is ejected, in order to prevent the nozzle clogging or ejection failure. However, the flushing has a disadvantage of consuming a large amount of ink.

Therefore, the liquid ejecting apparatus 100 performs a circulation operation and a micro-vibration operation in order to prevent nozzle clogging and ejection failure without wasting a large amount of ink.

The liquid ejecting apparatus 100 includes the circulation mechanism 60. Since the circulation mechanism 60 is provided, the circulation operation of discharging the ink while supplying the ink to the individual flow path IP including the nozzle N can be performed. Therefore, even when the ink thickens due to evaporation of the ink at the ejection side opening end N1 of the nozzle N, the ink is discharged to the common discharge flow path R2 via the individual flow path IP, and fresh ink is supplied from the common supply flow path R1. Therefore, the ink can be prevented from thickening at the ejection side opening end N1.

Further, the drive control unit 20 described above performs ejection control to drive the piezoelectric element 51*e* to eject the ink, and performs micro-vibration control to drive the piezoelectric element 51*e* to micro-vibrate the ink in the nozzle N. The micro-vibration control is performed during a non-ejection period when the ink is not ejected from the nozzle N. According to the micro-vibration control, it is possible to micro-vibrate a meniscus MN to the extent that the ink is not ejected from the nozzle N. By performing the micro-vibration control, the ink in the nozzle N is agitated during the non-ejection period. Therefore, the ink can be prevented from thickening near the ejection side opening end N1.

In a normal nozzle having a uniform width, the thickening of the ink can be suppressed by performing at least one of the circulation operation or the micro-vibration operation described above. In contrast, in the case of the so-called two-stage nozzle, it may be necessary to use the circulation operation and the micro-vibration operation in combination.

For example, the total length E of the nozzle N, which is the two-stage nozzle, tends to be larger than the total length of the normal nozzle N having a uniform width in order to ensure a certain degree of length of each of the first nozzle portion NP1 and the second nozzle portion NP2 in the Z-axis direction. Therefore, in the two-stage nozzle, it is difficult for a circulating flow of the ink in the individual flow path IP to reach the first nozzle portion NP1. For this reason, in the two-stage nozzle, the circulation operation and the micro-vibration operation may be used in combination.

By using the circulation operation and the micro-vibration operation in combination, an ink flow is generated in the nozzle N by the micro-vibration operation, and the ink can be smoothly replaced between the nozzle N and the nozzle flow path Nfa due to an action of the circulating flow of the ink by the circulation mechanism 60. Therefore, the ink in the nozzle N can be prevented from thickening while avoiding the waste of the ink due to the flushing.

However, a problem that it is difficult to occur in the normal nozzle having a uniform width occurs when the circulation operation and the micro-vibration operation are used in combination in the two-stage nozzle. Specifically, when the circulation operation and the micro-vibration operation are used in combination in the two-stage nozzle, problems such as a meniscus breakage and a failure to eliminate the thickening of the liquid in the nozzle N occur in some cases. The meniscus breakage means a breakage of an interface due to collision between the meniscus MN during the micro-vibration and a circulating flow of the nozzle flow path Nfa flowing into the nozzle N. The meniscus breakage causes air bubbles that may exist in the nozzle N to become finer, deteriorating ink ejection characteristics.

As a result of an intensive study conducted by the inventors to solve such problems in the two-stage nozzle, it has been found that there is a correlation between a flow path resistance ratio R1N/R2N and M/C which is a ratio of a maximum retraction amount M of the meniscus MN with respect to the height C of the first nozzle portion NP1. The flow path resistance ratio R1N/R2N is a ratio between a flow resistance R1N of the first nozzle portion NP1 and a flow resistance R2N of the second nozzle portion NP2. The flow path resistance ratio R1N/R2N is related to sizes of the first nozzle portion NP1 and the second nozzle portion NP2. Therefore, it has been found that there is a correlation between the sizes of the first nozzle portion NP1 and the second nozzle portion NP2 and the ratio M/C described above. It has also been found that it is possible to prevent the breakage of the meniscus MN and the failure to eliminate the thickening of the ink in the nozzle N, by setting a value of the correlation within a predetermined range.

The flow path resistance ratio R1N/R2N can be calculated as follows. First, a flow resistance R of a circular flow path is expressed by the following Formula [2]:

$$R=128\mu L/\pi d^4. \qquad [2]$$

In Formula [2], μ represents a liquid viscosity, L represents a flow path length, and d represents a flow path diameter.

Next, the flow path resistance ratio R1N/R2N is calculated by using Formula [2]. When calculating the flow path resistance ratio R1N/R2N, "128μ/n" in Formula [2] is a constant that is offset, and thus, "128μ/n" will be written as "a" below for simplicity.

The flow path resistance R1N of the first nozzle portion NP1 and the flow path resistance R2N of the second nozzle portion NP2 are as follows:

$$R1N=\alpha\times C/A^4,$$

and $$R2N=\alpha\times D/B^4.$$

Therefore, the flow path resistance ratio R1N/R2N is expressed by the following Formula [3]:

$$(R1N/R2N)=(CB^4)/(DA^4). \qquad [3]$$

As described above, the intensive study conducted by the inventors revealed that there is a correlation between the flow path resistance ratio R1N/R2N and the ratio M/C, and more specifically, that there is a proportional relationship. In other words, the following Formula [4] holds.

$$(M/C)\propto(R1N/R2N) \qquad [4]$$

The following Formula [5] holds based on Formulas [3] and [4].

$$M\propto(C^2B^4)/(DA^4) \qquad [5]$$

Further, as described above, it has also been found that it is possible to prevent the breakage of the meniscus MN and the failure to eliminate the thickening of the ink in the nozzle N, by setting a value of the correlation shown in Formula [5] within a predetermined range. Specifically, the drive control unit 20 causes the piezoelectric element 51*e* to perform the micro-vibration control so as to satisfy the following Formula [1]:

$$\{(C^2B^4)/(DA^4)\}\times 0.052 \le M \le \{(C^2B^4)/(DA^4)\}\times 0.0365 \quad [1]$$

M in Formula [1] represents the maximum retraction amount of the meniscus MN of the ink during the micro-vibration control by the drive control unit 20. The maximum retraction amount M means a state in which the meniscus MN is positioned furthest in the Z1 direction within the nozzle N. A represents the diameter of the first nozzle portion NP1. B represents the diameter of the second nozzle portion NP2. C represents the height of the first nozzle portion NP1. D represents the height of the second nozzle portion NP2.

Since the drive control unit 20 performs the micro-vibration control so as to satisfy Formula [1], it is possible to prevent the breakage of the meniscus MN and the failure to eliminate the thickening of the ink in the nozzle N. The two-stage nozzle has a more complex configuration than the normal nozzle having a uniform width, and the flow path resistance in the nozzle N is significantly different from that of the normal nozzle having a uniform width. Simply providing the two-stage nozzle causes the meniscus breakage or the failure to eliminate the thickening of the ink in the nozzle N due to an influence of the flow path resistance in the two-stage nozzle. The values on the right and left sides of Formula [1] are values obtained by experiments described below. According to the experiments conducted by the inventors, it has been found that it is possible to suppress both the meniscus breakage and the failure to eliminate the thickening of the ink in the nozzle N by designing the two-stage nozzle that satisfies Formula [1].

Each of FIGS. 6 and 7 is a table showing the experimental results. Each of FIGS. 6 and 7 illustrates an example of the correlation value shown in Formula [5]. Specifically, multiple examples in which the maximum retraction amount M of the meniscus MN and $(C^2B^4)/(DA^4)$ in Formula [5] are changed are illustrated.

Specifically, in Examples 1, 2, 3, 4, and 5 and Comparative Examples 1, 2, 3, 4, 5 and 6, $(C^2B^4)/(DA^4)$ in Formula [1] is the same, and the maximum retraction amount M is different. In Examples 6, 7, 8, and 9 and Comparative Examples 7, 8, 9 and 10, $(C^2B^4)/(DA^4)$ in Formula [1] is the same, and the maximum retraction amount M is different. In Examples 10, 11, and 12 and Comparative Examples 11, 12, and 13, $(C^2B^4)/(DA^4)$ in Formula [1] is the same, and the maximum retraction amount M is different. In Examples 13, 14, 15, 16, and 17 and Comparative Examples 14, 15, 16, 17, 18, and 19, $(C^2B^4)/(DA^4)$ in Formula [1] is the same, and the maximum retraction amount M is different. In Examples 18, 19, 20, 21, and 22 and Comparative Examples 20, 21, 22, 23, 24, and 25, $(C^2B^4)/(DA^4)$ in Formula [1] is the same, and the maximum retraction amount M is different.

For the examples and comparative examples, the presence or absence of the breakage of the meniscus MN and the presence or absence of the failure to eliminate the thickening of the ink was evaluated. "Good" indicates a case where there is no breakage of the meniscus MN, and "poor" indicates a case where there is a breakage of the meniscus MN. "Fair" indicates a case where there is no breakage of the meniscus MN but there is a possibility of causing destruction. In addition, "good" indicates a case where there is no failure to eliminate the thickening of the ink, and "poor" indicates a case where there is a failure to eliminate the thickening of the ink. "Fair" indicates a case where there is no failure to eliminate the thickening of the ink, but there is a possibility that the elimination of the thickening is not sufficient. "Fair" is inferior to "good", but better than "poor".

In each of the examples, there was neither the breakage of the meniscus MN nor the failure to eliminate the thickening of the ink, and favorable ejection characteristics were exhibited. On the other hand, in each of the comparative examples, at least one of the breakage of the meniscus MN or the failure to eliminate the thickening of the ink occurred, and the ejection characteristics were not favorable.

Figure 8:
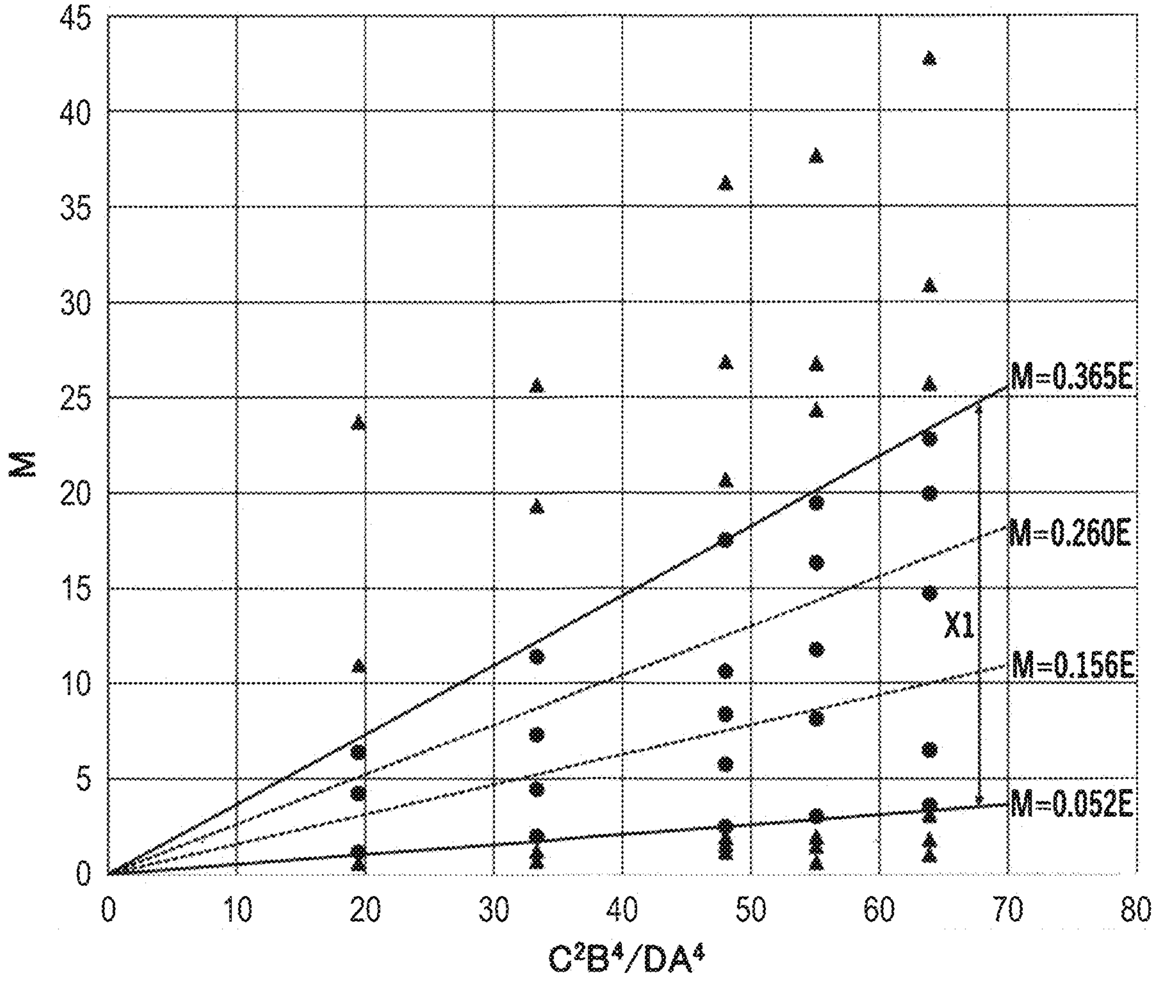
FIG. 8 is a graph illustrating experimental results.

FIG. 8 is a graph illustrating experimental results. The horizontal axis in FIG. 8 represents $(C^2B^4)/(DA^4)$ in Formula [1], and the vertical axis represents the maximum retraction amount M. In FIG. 8, the examples of FIG. 6 and FIG. 7 are plotted. In addition, a vertically arranged plot group in FIG. 8 is an example in which $(C^2B^4)/(DA^4)$ in Formula [1] is the same.

The plots indicated by circles in FIG. 8 are pieces of data indicating "good" or "fair" for both the presence or absence of the breakage of the meniscus MN and the presence or absence of the failure to eliminate the thickening in the experimental results illustrated in FIG. 6 and FIG. 7, and correspond to data of the examples. The plots indicated by triangles in FIG. 8 are pieces of data indicating "poor" for any one of the presence or absence of the breakage of the meniscus MN and the presence or absence of the failure to eliminate the thickening in the experimental results illustrated in FIG. 6 and FIG. 7, and correspond to data of the comparative examples. As can be seen from FIG. 8, there is a boundary that satisfies Formula [1] between an example with an excellent evaluation result and a comparative example with an inferior evaluation result compared to the example. This shows that there is a correlation between the maximum retraction amount M and $(C^2B^4)/(DA^4)$ in Formula [1]. In other words, there is a correlation between the maximum retraction amount M, and the height C and the diameter A of the first nozzle portion NP1 and the height D and the diameter B of the second nozzle portion NP2. Specifically, as indicated by solid lines in the experimental results in FIG. 8, an upper limit value was calculated as $M=0.365\times(C^2B^4)/(DA^4)$, and a lower limit value was calculated as $M=0.052\times(C^2B^4)/(DA^4)$. The lower limit value, which is the left side of Formula [1], and the upper limit value, which is the right side of Formula [1], were obtained from the experimental results in FIG. 8.

By setting the maximum retraction amount M within a range X1 that satisfies Formula [1], it is possible to prevent both the breakage of the meniscus MN and the failure to eliminate the thickening of the ink.

On the other hand, when the maximum retraction amount M is less than the lower limit value of Formula [1], the flow path resistance cannot be overcome, and the maximum retraction amount M of the meniscus MN becomes small. Therefore, the thickening ink remains in the nozzle N. As a result, the failure to eliminate the thickening of the ink cannot be prevented, and nozzle clogging may occur. Furthermore, when the maximum retraction amount M exceeds the upper limit value of Formula [1], the meniscus MN is easily broken by collision with the circulating flow in the nozzle flow path Nfa without being affected much by the flow path resistance. Therefore, air bubbles that can occur in the nozzle N become finer. As a result, the ink ejection characteristics deteriorate.

Furthermore, the drive control unit 20 may perform the micro-vibration control such that $(C^2B^4)/(DA^4)\times 0.156\leq M$. A straight line representing $(C^2B^4)/(DA^4)\times 0.156$ is indicated by a broken line in FIG. 8. By setting the maximum retraction amount M to the lower limit value or more, it is possible to more effectively prevent the occurrence of the failure to eliminate the thickening of the ink as compared to when the maximum retraction amount M is less than the lower limit value.

The drive control unit 20 may perform the micro-vibration control such that $M\leq(C^2B^4)/(DA^4)\times 0.260$. A straight line representing $(C^2B^4)/(DA^4)\times 0.260$ is indicated by a broken line in FIG. 7. By setting the maximum retraction amount M to the upper limit value or less, it is possible to more effectively avoid the breakage of the meniscus MN as compared to when the maximum retraction amount M exceeds the upper limit value.

Although not illustrated separately in FIG. 8, there are six pieces of data indicating "good" for both the presence or absence of the breakage of the meniscus MN and the presence or absence of the failure to eliminate the thickening in FIG. 6 and FIG. 7, that is, Examples 3, 4, 8, 11, 15, and 20. It can be said that the six examples are more favorable than other examples. The six examples correspond to six plots between $M=0.156\times(C^2B^4)/(DA^4)$ and $M=0.260\times(C^2B^4)/(DA^4)$ in FIG. 8. The more favorable lower limit value $M=0.156\times(C^2B^4)/(DA^4)$ and the more favorable upper limit value $M=0.260\times(C^2B^4)/(DA^4)$ are values obtained in this way.

The heights C and D of the nozzle N are not particularly limited as long as Formula [1] is satisfied, and the nozzle N may satisfy $0.4\leq C/D\leq 0.8$. When the height C is excessively small, there is no room for a movement width of the meniscus MN in the first nozzle portion NP1, and there is a possibility that the micro-vibration operation is not performed sufficiently. Therefore, when C/D of the nozzle N is less than the lower limit value, there is a possibility that the micro-vibration operation is not performed sufficiently. Furthermore, in a case where the total length E is fixed, when the height C is excessively large, the height D becomes small, and thus, the meniscus MN is likely to collide with the circulating flow of the individual flow path IP, and the meniscus MN may be likely to break. Therefore, when C/D of the nozzle N exceeds the upper limit value, there is a possibility that the meniscus MN is more likely to break than when C/D of the nozzle N is equal to or less than the upper limit value.

Specific values of the heights C and D are not particularly limited, and are, for example, 10 μm or more and 100 μm or less.

The diameters A and B of the nozzle N are also not particularly limited as long as Formula [1] is satisfied, and the nozzle N may satisfy $1.1\leq B/A\leq 1.7$. When the diameter B is excessively small, an opening width at the coupling portion N2 between the nozzle N and the nozzle flow path Nfa becomes small. When the opening width becomes small, efficiency in supplying the ink to the nozzle N decreases. Therefore, when B/A of the nozzle N is less than the lower limit value, there is a possibility that the efficiency in supplying the ink to the nozzle N decreases. Furthermore, when the diameter B is increased while the diameter A remains the same, a step between the first nozzle portion NP1 and the second nozzle portion NP2 becomes excessively large, and thus, there is a possibility that the ink remains in the nozzle N. Therefore, when B/A of the nozzle N exceeds the upper limit value, there is a possibility that the ink remains in the nozzle N.

When the diameter B is increased while increasing the diameter A, the step can be decreased in size, but the overall width of the nozzle N becomes excessively large. As a result, straightness of the droplets ejected from the nozzle N decreases. Specific values of the diameter A and the diameter B are not particularly limited, and are, for example, 10 μm or more and 100 μm or less.

The drive control unit 20 may perform the micro-vibration control such that $M<C$. It is possible to suppress the circulating flow in the nozzle flow path Nfa from affecting the meniscus MN by setting the maximum retraction amount M to be smaller than the height C. Therefore, it is possible to effectively suppress the risk of meniscus breakage.

The drive control unit 20 performs the micro-vibration control in a state in which the ink is supplied from the common supply flow path R1 to the individual flow path IP, and the ink is discharged from the individual flow path IP to the common discharge flow path R2. In other words, the drive control unit 20 performs the circulation operation and the micro-vibration operation at the same time. In the liquid ejecting apparatus 100 in which both the circulation operation and the micro-vibration operation are performed at the same time, it is possible to effectively suppress the meniscus breakage and the failure to eliminate the thickening of the ink in the nozzle N in the two-stage nozzle by satisfying Formula [1].

2. Modified Examples

Each embodiment exemplified above can be modified in various ways. Specific modified aspects that can be applied to each embodiment described above are described below by way of example. Any two or more aspects selected from the following examples can be appropriately and compatibly combined.

The liquid ejecting apparatus 100 according to the embodiment described above includes the circulation mechanism 60 to circulate the ink in the individual flow paths IP. However, for example, the ink in the individual flow paths IP may also be circulated by driving two piezoelectric elements 51*e* provided for one nozzle N. In this case, the circulation mechanism 60 may be omitted.

In the embodiment described above, two piezoelectric elements 51*e* are provided for one nozzle N. However, the liquid ejecting apparatus 100 may also have a configuration in which only one piezoelectric element 51*e* is provided for one nozzle N.

In the embodiment described above, the liquid ejecting apparatus 100 is a serial type in which the carriage 41 reciprocates. However, the liquid ejecting apparatus 100 may be a line type in which the plurality of nozzles N are distributed across the entire width of the medium 90.

The liquid ejecting apparatus 100 exemplified in the embodiment described above may be employed in various devices such as a facsimile machine and a copying machine in addition to a device dedicated to printing, and the application of the present disclosure is not particularly limited. The use of the liquid ejecting apparatus is not limited to printing. For example, the liquid ejecting apparatus that ejects a solution of a coloring material is used as a producing apparatus that forms a color filter of a display device such as a liquid crystal display panel. Further, the liquid ejecting apparatus that ejects a solution of a conductive material is used as a producing apparatus that forms a wiring or electrode of a wiring substrate. Further, the liquid ejecting apparatus that ejects a solution of organic matter related to a living body is used as, for example, a producing apparatus that produces a biochip.

Although the present disclosure has been described above based on the exemplary embodiments, the present disclosure is not limited to the above-described embodiments. Further, a configuration of each portion according to the present disclosure can be substituted with any configuration that can implement the same functions as the above-described embodiments, and any configuration can also be added.

What is claimed is:

1. A liquid ejecting apparatus comprising:

a liquid ejecting head that includes a plurality of individual flow paths that each include a pressure chamber and a nozzle, a common supply flow path that communicates with the plurality of individual flow paths and supplies a liquid to the plurality of individual flow paths, a common discharge flow path that communicates with the plurality of individual flow paths and discharges the liquid from the plurality of individual flow paths, and a piezoelectric element provided corresponding to the pressure chamber; and a drive control unit that performs ejection control for driving the piezoelectric element to eject the liquid and micro-vibration control for driving the piezoelectric element to micro-vibrate the liquid in the nozzle, wherein in the nozzle, a first nozzle portion and a second nozzle portion provided closer to the individual flow path than the first nozzle portion is and having a diameter larger than a diameter of the first nozzle portion are connected in a height direction, and the drive control unit performs the micro-vibration control such that $(C^2B^4)/(DA^4)\times 0.052 \leq M \leq (C^2B^4)/(DA^4)\times 0.365$, in which A represents the diameter of the first nozzle portion, B represents the diameter of the second nozzle portion, C represents a height of the first nozzle portion, D represents a height of the second nozzle portion, and M represents a maximum retraction amount of a meniscus of the liquid during the micro-vibration control by the drive control unit.

2. The liquid ejecting apparatus according to claim 1, wherein the drive control unit performs the micro-vibration control such that $(C^2B^4)/(DA^4)\times 0.156 \leq M$.

3. The liquid ejecting apparatus according to claim 1, wherein the drive control unit performs the micro-vibration control such that $M\ (C^2B^4)/(DA^4)\times 0.260$.

4. The liquid ejecting apparatus according to claim 1, wherein the nozzle satisfies $0.4 \leq C/D \leq 0.8$.

5. The liquid ejecting apparatus according to claim 1, wherein the nozzle satisfies $1.1 \leq B/A \leq 1.7$.

6. The liquid ejecting apparatus according to claim 1, wherein the drive control unit performs the micro-vibration control so as to further satisfy $M<C$.

7. The liquid ejecting apparatus according to claim 1, wherein the drive control unit performs the micro-vibration control in a state in which the liquid is supplied from the common supply flow path to the individual flow path and the liquid is discharged from the individual flow path to the common discharge flow path.

8. The liquid ejecting apparatus according to claim 1, wherein in the nozzle, a central axis of the first nozzle portion and a central axis of the second nozzle portion are aligned with each other.

* * * * *